United States Patent [19]

Niwa et al.

[11] Patent Number: 4,801,696

[45] Date of Patent: Jan. 31, 1989

[54] PHENYLAZOCYANOTHIOPHENEAZOANILINE DYES FOR DYEING CELLULOSE-CONTAINING FIBERS IN BLUE TO BLUISH GREEN SHADES

[75] Inventors: Toshio Niwa; Kiyoshi Himeno; Toshio Hihara, all of Kanagawa; Shuichi Maeda, Saitama, all of Japan

[73] Assignee: Mitsubishi Chemical Industries Limited, Tokyo, Japan

[21] Appl. No.: 65,184

[22] Filed: Jun. 22, 1987

Related U.S. Application Data

[63] Continuation of Ser. No. 495,874, May 18, 1983, abandoned.

[30] Foreign Application Priority Data

May 18, 1982 [JP] Japan ................................. 57-83747
Feb. 3, 1983 [JP] Japan ................................. 58-16795

[51] Int. Cl.$^4$ .................. C09B 31/043; C09B 33/02; D06P 1/18; D06P 3/36
[52] U.S. Cl. .................................. 534/761; 534/581; 534/795; 534/887
[58] Field of Search ........................................ 534/761

[56] References Cited

U.S. PATENT DOCUMENTS 4,180,503 12/1979 Bruck, I et al. .................. 534/761

FOREIGN PATENT DOCUMENTS 2438496 2/1976 Fed. Rep. of Germany ...... 534/761
2114144 8/1983 United Kingdom ................ 534/761

*Primary Examiner*—Floyd D. Higel
*Attorney, Agent, or Firm*—Sughrue, Mion, Zinn, Macpeak and Seas

[57] ABSTRACT

Disazo dyes for dyeing cellulose-containing fibers represented by the following general formula:

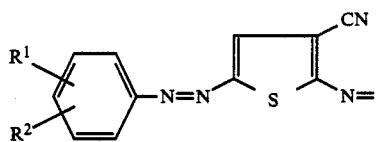

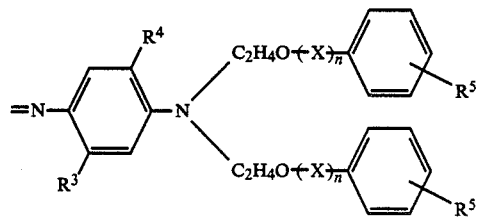

wherein $R^1$ and $R^2$ each represents a hydrogen atom, a halogen atom, a nitro group, a cyano group, a thiocyanato group, a trifluoromethyl group, a formyl group, a lower alkoxycarbonyl group, a lower alkylsulfonyl group, a sulfamoyl group, an N-lower alkylsulfamoyl group or an N,N-di-lower alkylsulfamoyl group, $R^3$ represents a hydrogen atom, a methyl group, a chlorine atom, a lower alkoxy group or an acylamino group, $R^4$ represents a hydrogen atom, a methyl group, a chlorine atom or a lower alkoxy group, $R^5$ represents a hydrogen atom, a lower alkyl group or a halogen atom, —X— represents

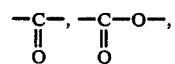

—SO$_2$— or —CH$_2$—, and n represents 0 or 1. These dyes are capable of dyeing cellulose-containing fibers, particularly fiber blends composed of cellulose fibers and polyester fibers, blue to bluish green with good fastness properties.

6 Claims, No Drawings

PHENYLAZOCYANOTHIOPHENEAZOANILINE DYES FOR DYEING CELLULOSE-CONTAINING FIBERS IN BLUE TO BLUISH GREEN SHADES

This is a continuation of application Ser. No. 06/495,874, filed May 18, 1983, now abandoned.

FIELD OF THE INVENTION

This invention relates to disazo dyes for dyeing cellulose-containing fibers. More particularly, it relates to disazo dyes capable of dyeing cellulose-containing fibers, particularly fiber blend composed of cellulose fibers and polyester fibers, blue to bluish green with good fastness properties.

BACKGROUND OF THE INVENTION

Japanese Patent Application (OPI) No. 41734/76 (the term "OPI" as used herein refers to a "published unexamined Japanese patent application") describes that disazo dyes represented by the following general formula (II):

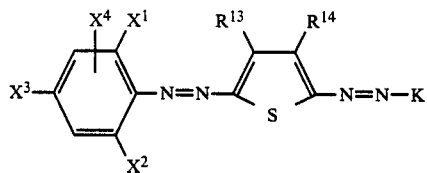

wherein K represents a coupling component group, $R^{13}$ represents a $C_1$–$C_4$ alkylaryl group, a $C_1$–$C_4$ alkoxycarbonyl group or a hydrogen atom, $R^{14}$ represents an aryl group, a $C_1$–$C_4$ alkoxycarbonyl group, $COW_1W_2$ or a cyano group, $X^1$ and $X^2$ each represents a hydrogen atom, a chlorine atom, a bromine atom, a cyano group, $CF_3$, a nitro group, a $C_1$–$C_4$ alkyl group, a $C_1$–$C_4$ alkoxy group, a phenyl group, a $C_1$–$C_4$ alkylcarbonyl group, a $C_1$–$C_4$ alkoxycarbonyl group, a $C_1$–$C_6$ alkylsulfonyl group, an arylsulfonyl group, a benzylsulfonyl group, COOH, $SO_2NW_1W_2$ or $CONW_1W_2$, provided that they do not represent hydrogen atoms at the same time, $X^3$ represents a hydrogen atom, a $C_1$–$C_4$ alkyl group, a $C_1$–$C_4$ alkoxy group, a chlorine atom, a bromine atom or a cyano group, $X^4$ represents a hydrogen atom, a methyl group, a chlorine atom or a bromine atom, and $W_1$ and $W_2$ each represents H, a $C_1$–$C_4$ alkyl group or a hydroxyethyl group or, when taken together, $W_1$ and $W_2$ form a residue of saturated 5- or 6-membered hetero ring, can dye polyester fibers to a violet to bluish green color. However, the Japanese OPI does not describe whether or not the dyes can dye cellulose-containing fibers.

On the other hand, Japanese Patent Application Nos. 10690/81 and 10691/81 describe as dyes for dyeing polyester fibers the dyes represented by the following structural formulae (III-A) and (III-B):

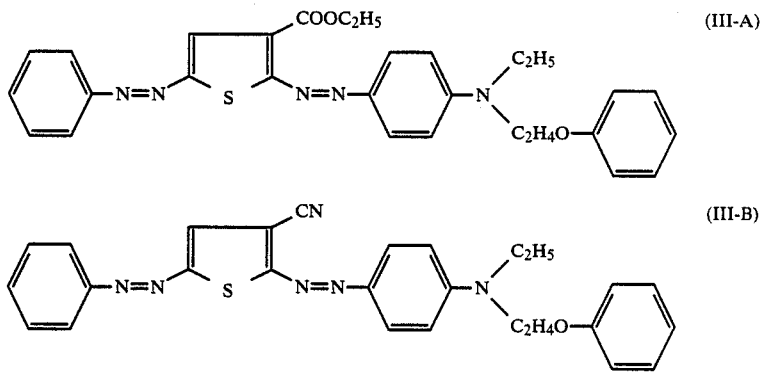

which are the same type of dyes as that described in the above Japanese OPI.

SUMMARY OF THE INVENTION

As a result of intensive investigations on the conventional dyes to find improved dyes for dyeing cellulose-containing fibers, it has been found that dyes (I) of the present invention having one or two more benzene rings than the above-described dyes of the structural formulae (III-A) and (III-B) can dye cellulose-containing fibers to a blue to bluish green color to yield products dyed with good light fastness, wet fastness, washing fastness, etc., thus having achieved the present invention.

Accordingly, an object of the present invention is to provide the disazo dyes for dyeing cellulose-containing fibers represented by the following general formula (I):

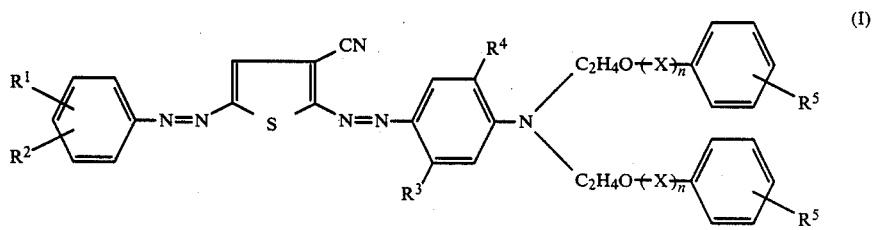

wherein $R^1$ and $R^2$ each represents a hydrogen atom, a halogen atom, a nitro group, a cyano group, a thiocyanato group, a trifluoromethyl group, a formyl group, a lower alkoxycarbonyl group, a lower alkylsulfonyl group, a sulfamoyl group, an N-lower alkylsulfamoyl group or an N,N-di-lower alkylsulfamoyl group, $R^3$ represents a hydrogen atom, a methyl group, a chlorine atom, a lower alkoxy group or an acylamino group, $R^4$ represents a hydrogen atom, a methyl group, a chlorine atom or a lower alkoxy group, $R^5$ represents a hydrogen atom, a lower alkyl group or a halogen atom, —X— represents

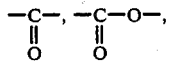

—SO$_2$— or —CH$_2$—, and n represents 0 or 1.

DETAILED DESCRIPTION OF THE INVENTION

The disazo dyes represented by the foregoing general formula (I) can be prepared by diazotizing an amine represented by the following formula (IV):

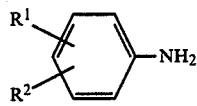
(IV)

wherein $R^1$ and $R^2$ are the same as defined above, coupling the diazotized product with 2-amino-3-cyanothiophene represented by the following formula (V):

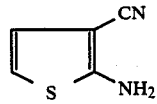
(V)

diazotizing the resulting monoazo compound represented by the following formula (VI):

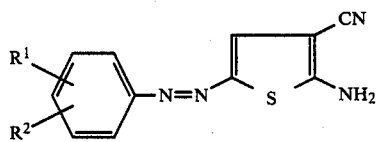
(VI)

wherein $R^1$ and $R^2$ are the same as defined above, and coupling the diazotized product with a coupling component represented by the following formula (VII):

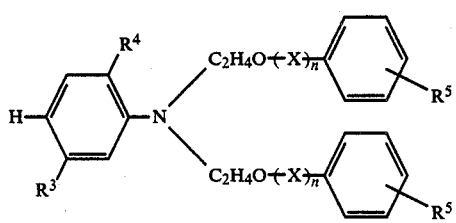
(VII)

wherein $R^3$, $R^4$, $R^5$, X and n are the same as defined hereinbefore.

Examples of the lower alkyl group represented by $R^5$ in the foregoing general formula (I) include a methyl group, an ethyl group, a straight or branched chain propyl or butyl group, and examples of the lower alkoxy group represented by $R^3$ and $R^4$ include a methoxy group, an ethoxy group, a straight or branched chain propoxy or butoxy group.

Examples of the lower alkoxycarbonyl group represented by $R^1$ or $R^2$ include a methoxycarbonyl group, an ethoxycarbonyl group, a propoxycarbonyl group, and a butoxycarbonyl group.

Examples of the lower alkylsulfonyl group represented by $R^1$ or $R^2$ include a methylsulfonyl group, an ethylsulfonyl group, a propylsulfonyl group, a butylsulfonyl group, etc.

Examples of the N-lower alkylsulfamoyl group represented by $R^1$ or $R^2$ include an N-methylsulfamoyl group, an N-ethylsulfamoyl group, and an N-butylsulfamoyl group, and examples of the N,N-di-lower alkylsulfamoyl group include an N,N-dimethylsulfamoyl group, an N,N-diethylsulfamoyl group, an N,N-dibutylsulfamoyl group, etc.

Examples of the acylamino group represented by $R^3$ include an acetylamino group, a propionylamino group, a chloropropionylamino group, a benzoylamino group, a methylsulfonylamino group, an ethoxycarbonylamino group, a benzenesulfonylamino group, etc.

As the cellulose-containing fibers dyeable with the dyes of the present invention, there are illustrated natural fibers such as cotton and hemp, semi-synthetic fibers such as viscose rayon and cuprammonium rayon, and partially aminated or partially acylated modified cellulose fibers. Of course, these may be woven or knitted fabrics and nonwoven fabric. Furthermore, there are illustrated blended or mixed fibers of the above-described fibers with other fibers such as polyester fibers, cation-dyeable polyester fibers, urethane fibers, di- or triacetate fibers, etc. Of these, cellulose fibers and blended or mixed fibers of cellulose fibers with polyester fibers are particularly effectively dyeable with the dyes in accordance with the present invention.

As the process for dyeing the above-described cellulose-containing fibers with the dyes of the present invention, a pad dyeing process and a printing process are particularly suitable.

The pad dyeing process is described in detail below. In practicing the pad dyeing process, the dye represented by the foregoing general formula (I) is desirably dispersed finely in a size of about 0.5 to $2\mu$ in a medium. The fine dispersion of the dye is effected, for example, by using a grinder such as a sand grinder or a mill to finely disperse the dye in water with the aid of a water-soluble dispersing agent such as a nonionic or anionic dispersing agent (e.g., sodium ligninsulfonate or sodium salt of a naphthalenesulfonic acid-formalin condensate), by finely dispersing the dye in other solvent than water such as an alcohol (e.g., ethyl alcohol, isopropyl alcohol, polyethylene glycol, etc.), a ketone (e.g., acetone, methyl ethyl ketone, etc.), a hydrocarbon (e.g., n-hexane, toluene, xylene, mineral turpentine, etc.), a halogenated hydrocarbon (e.g., tetrachloroethylene), an ester (e.g., ethyl acetate, butyl acetate, etc.), an ether (e.g., dioxane, tetraethylene glycol dimethyl ether, etc.), or the mixture thereof using a slightly water-soluble or water-insoluble dispersing agent such as an adduct of sulfosuccinic ester or nonylphenol and some mols of ethylene oxide, or by finely dispersing the dye in a mixture system composed of water and a solvent freely miscible with water and selected from the above-described solvents.

Furthermore, in the above-described finely dispersing step, a high molecular compound soluble in each dispersion medium or a surfactant exerting mainly other actions than dispersing action may be added.

This fine dispersion of the dye may be used as such as a pad bath for the pad dyeing process or as a printing color paste for the printing process. Usually, however, it is diluted to use, to a desired degree depending upon intended dyeing density, with water or a mixture of a freely water-miscible solvent and water or diluted into an o/w emulsion or w/o emulsion wherein a petroleum hydrocarbon such as mineral turpentine or a halogenated hydrocarbon such as tetrachloroethylene forms an oil phase.

In preparing a pad bath or a printing color paste, a cellulose fiber-swelling agent is added for advantageously practicing the present invention. In addition, for the purpose of preventing dry migration upon pad dyeing or for adjusting the viscosity of a color paste to an optimal degree in a particular printing, a thickening agent such as a water-soluble high polymer (e.g., sodium alginate) may be added.

Presence of the cellulose-swelling agent in the pad bath or printing color paste is not always necessary, and the agent may alternatively be previously allowed to exist on fibers.

As the cellulose fiber-swelling agent, any one that has a boiling point of 150° C. or above and can swell cellulose fibers can be used; for example, there are illustrated ureas such as N,N,N',N'-tetramethylurea, polyhydric alcohols such as polyethylene glycol and polypropylene glycol, and the derivatives thereof. In particular, polyhydric alcohols such as polyethylene glycol and polypropylene glycol having a mean molecular weight of about 200 to 500 and the derivatives thereof are preferable as the swelling agent. The swelling agent is suitably used in an amount of about 5 to 25 wt%, preferably about 8 to 15 wt%, based on the pad bath or the printing color paste.

Dyeing of the aforesaid fibers with the dyes of the present invention is effected in a conventional manner, for example, by impregnating or printing a cellulose-containing substrate in a pad bath or with a printing color paste and, after drying, subjecting it to a heat treatment with a 160° to 220° C. hot air or super-heated vapor for 30 seconds to 10 minutes or to a heat treatment in 120° to 150° C. high pressure saturated steam for 3 minutes to 30 minutes, and washing with a surfactant-containing hot water or with an o/w or w/o emulsion washing bath wherein a halogenated hydrocarbon such as tetrachloroethylene forms an oil phase or in an ordinary dry-cleaning manner.

The above-described process provides products dyed distinctly and uniformly with good light fastness and wet fastness.

The present invention will now be described in more detail by the following examples of preferred embodiments of the present invention. However, the present invention is not to be limited by them, and variations and modifications can be effected within the spirit and scope of the invention.

EXAMPLE 1

A dye composition comprising 15 g of disazo dye represented by the following structural formula:

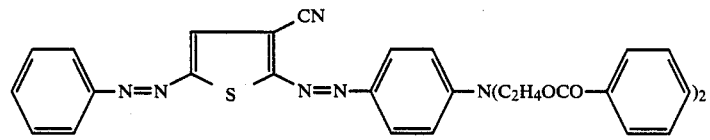

15 g of a naphthalenesulfonic acid-formaldehyde condensate, and 70 ml of water was converted to a dye dispersion using a paint shaker as a finely dispersing machine.

A printing color paste using this dye dispersion was prepared according to the following formulation:

| | |
|---|---|
| Dye dispersion | 6.5 g |
| 5% Sodium alginate aqueous solution | 55 g |
| Polyethylene glycol dimethyl ether (mean molecular weight: 400) | 9 g |
| Water | balance |
| | 100 g |

The resulting color paste was applied to a polyester/cotton blended fabric (blending ratio: 65/35) using a screen printing machine, dried at 80° C. for 3 minutes, then dry-heated at 215° C. to fix. After washing with water, the fabric was subjected to soaping step using a washing solution containing 2 g/liter of a nonionic surfactant (trade name: Scourol #900; made by Kao Soap Co., Ltd.) for 20 minutes with a bath ratio of 1:30 to obtain a blue-dyed product with excellent light fastness.

Polyester fibers obtained by treating a part of the thus dyed product with 70% sulfuric acid to dissolve away cotton fibers therefrom, and cellulose fibers obtained by treating the remaining dyed product with hexafluoroisopropanol to dissolve away polyester fibers therefrom were compared to each other with respect to hue. As a result, it was found that they showed extremely good hue and good light fastness.

The dye used in this Example was prepared according to the following process.

18.6 g of aniline was dissolved in 300 ml of 7% hydrochloric acid, and cooled to 2° C. Then, 100 ml of 2N sodium nitrite was added thereto, during which the temperature of the solution was kept at 5° C. or less. The resulting aniline diazonium salt solution was added to a solution of 30 g of 2-amino-3-cyanothiophene in 400 ml of methanol at 2° C., and the solution was stirred for 2 hours at the same temperature. Then, a precipitated monoazo compound was collected by filtration, washed with water, and dried.

Separately, 2.0 g of sodium sulfite was added to 28.8 ml of 98% sulfuric acid and heated to 55° C. to dissolve. Thus, there was prepared nitrosylsulfuric acid.

This reaction solution was cooled, and 9.12 g of acetic acid was added thereto at 5° to 10° C. Subsequently, 40% sulfuric acid was dropwise added thereto.

Further, 4.56 g of the compound represented by the following formula:

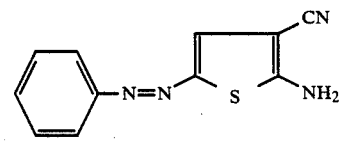

was added thereto, and the resulting solution was stirred for 2 hours at −2° to 0° C., followed by adding thereto 1.0 g of urea to prepare a diazo solution.

On the other hand, 7.8 g of N,N-di(β-phenylcarbonyloxyethyl)aniline was dissolved in 500 ml of methanol to prepare a coupling solution.

To this coupling solution was added the diazo solution at 0° to 5° C. in 30 minutes, and the resulting solution was stirred for 5 hours. Crystals precipitated were collected by filtration, washed with water, and dried to obtain 10.5 g of the end dye.

This product has a λmax (acetone) of 605 nm.

EXAMPLE 2

Printing was conducted according to the procedure described in Example 1 using a disazo dye represented by the following structural formula:

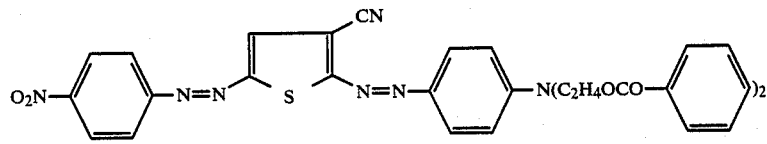

to obtain a greenish blue-dyed product with excellent light fastness.

The dye used in this example was prepared according to the process described in Example 1.

This product had a λmax (acetone) of 640 nm.

EXAMPLE 3

A dye composition comprising 15 g of a disazo dye represented by the following structural formula:

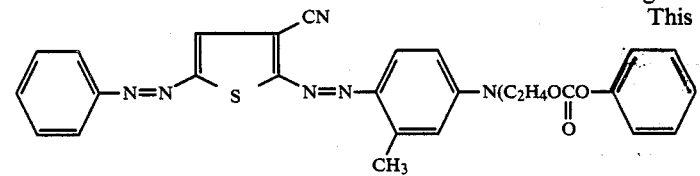

15 g of a naphthalenesulfonic acid-formaldehyde condensate, and 70 ml of water was converted to a dye dispersion using a sand grinder as a finely dispersing machine. A printing color paste was prepared using this dye dispersion according to the following formulation.

| | |
|---|---|
| Dye dispersion | 7 g |
| 5% Sodium alginate aqueous solution | 55 g |
| Polypropylene glycol | 12 g |

| | |
|---|---|
| (mean molecular weight: 300) | |
| Water | balance |
| | 100 g |

This color paste was applied to cotton broad (counts of yarn: 40) having been subjected to mercerization, using a screen printing machine, dried at 80° C. for 3 minutes, then treated with superheated steam at 190° C. for 7 minutes.

Subsequent washing procedure was conducted according to the procedure described in Example 1 to obtain a blue-dyed product having excellent light fastness and wet fastness.

The dye used in this Example was prepared according to Example 1.

This product had a λmax (acetone) of 615 nm.

EXAMPLE 4

Printing was effected according to the process described in Example 3 using a disazo dye represented by the following formula:

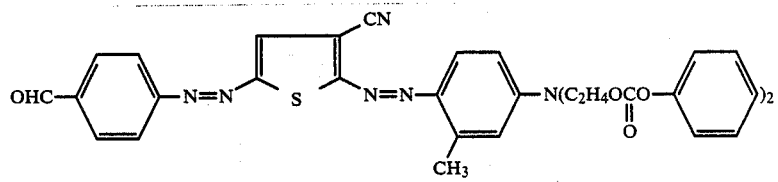

to obtain a blue-dyed product having good light fastness and wet fastness.

The dye used in this Example was prepared according to the process described in Example 1.

This product has a λmax (acetone) of 625 nm.

EXAMPLE 5

A dye composition comprising 16 g of a dye represented by the following structural formula:

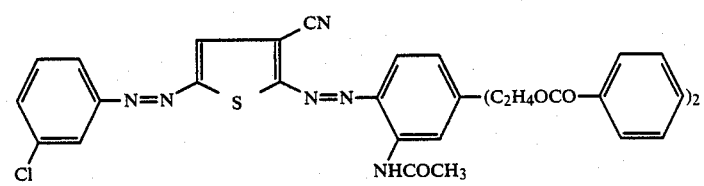

10 g of polyoxyethylene glycol nonylphenyl ether (HLB: 13.3), and 74 g of water was converted to a dye dispersion by finely dispersing it in a sand grinder. A pad bath of the following formulation was prepared using the dye dispersion:

| Dye dispersion | 6 g |
| --- | --- |
| Tetraethylene glycol dimethyl ether | 15 g |
| Water | balance |
| | 100 g |

A polyester/cotton blended fabric (blending ratio: 65/35) was impregnated with the bath and, after squeezing 75%, dried at 100° C. for 2 minutes, and dry-heated at 210° C. for 1 minute to set. After washing the fabric in a hot ethanol bath, there was obtained a greenish blue-dyed product with no unevenness and with excellent wet fastness.

The dye used in this Example was prepared according to the process described in Example 1.

This product had a λmax (acetone) of 632 nm.

EXAMPLE 6

Pad dyeing was conducted in the same manner as in Example 5 using a dye represented by the following structural formula:

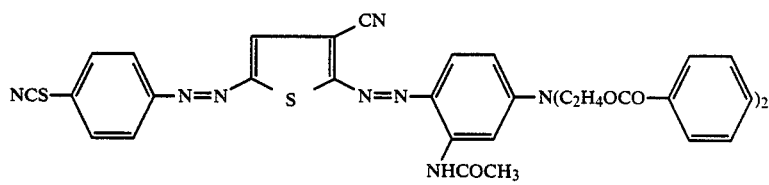

to obtain a greenish blue-dyed product having no unevenness and having excellent wet fastness.

The dye used in this Example was prepared according to the process described in Example 1.

This product had a λmax (acetone) of 637 nm.

EXAMPLE 7

Printing was conducted using disazo dyes given in following Tables 1, 2, 3, 4, 5 and 6. Color tones of resulting dyed products and λmaxes (acetone) of the dyes used are also given in Tables 1, 2, 3, 4, 5 and 6.

TABLE 1

| No. | $R^1$/$R^2$-phenyl | —$R^3$ | —$R^4$ | Hue of Dyed Fabric | λmax (acetone) (nm) |
| --- | --- | --- | --- | --- | --- |
| 1 | phenyl | —CH$_3$ | —H | blue | 618 |
| 2 | phenyl | —NHCOCH$_3$ | —H | blue | 627 |
| 3 | phenyl | —NHSO$_2$CH$_3$ | —H | blue | 623 |
| 4 | phenyl | —CH$_3$ | —CH$_3$ | blue | 620 |
| 5 | phenyl | —H | —OCH$_3$ | blue | 624 |

TABLE 1-continued

Structure:
R¹,R²-substituted phenyl—N=N—[thiophene with CN and S]—N=N—[phenyl with R³, R⁴ and —N(C₂H₄OCOC₆H₅)₂]

| No. | R¹,R² phenyl group | —R³ | —R⁴ | Hue of Dyed Fabric | λmax (acetone) (nm) |
|---|---|---|---|---|---|
| 6 | phenyl | —Cl | —H | blue | 592 |
| 7 | phenyl | —Cl | —OC₂H₅ | blue | 607 |
| 8 | phenyl | —CH₃ | —OCH₃ | blue | 625 |
| 9 | phenyl | —NHCOC₆H₅ | —H | blue | 626 |
| 10 | 4-Cl-phenyl | —CH₃ | —H | blue | 629 |
| 11 | 3-Cl-phenyl | —CH₃ | —CH₃ | blue | 621 |
| 12 | 3-NO₂-phenyl | —H | —OC₂H₅ | greenish blue | 638 |
| 13 | 2-CF₃-phenyl | —NHCOCH₃ | —H | blue | 631 |
| 14 | 4-(H₃CSO₂)-phenyl | —NHCOC₆H₅ | —H | blue | 630 |
| 15 | 4-((C₂H₅)₂NSO₂)-phenyl | —H | —H | blue | 631 |

TABLE 1-continued
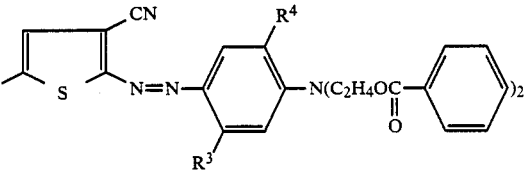
| No. | R¹/R² aryl | —R³ | —R⁴ | Hue of Dyed Fabric | λmax (acetone) (nm) |
|---|---|---|---|---|---|
| 16 | 2-CF₃, 5-Cl phenyl | —H | —H | greenish blue | 637 |
| 17 | 4-(CH₃OOC) phenyl | —NHCOH | —H | greenish blue | 645 |
| 18 | 4-F phenyl | —CH₃ | —H | blue | 621 |
| 19 | 4-F phenyl | —NHCOCH₃ | —H | blue | 630 |
| 20 | 4-F phenyl | —NHSO₂CH₃ | —H | blue | 626 |
| 21 | 4-F phenyl | —CH₃ | —CH₃ | blue | 623 |
| 22 | 4-F phenyl | —H | —OCH₃ | blue | 627 |
| 23 | 4-F phenyl | —Cl | —H | blue | 595 |
| 24 | 4-F phenyl | —Cl | —OC₂H₅ | blue | 610 |
| 25 | 4-F phenyl | —CH₃ | —OCH₃ | blue | 628 |
| 26 | 4-F phenyl | —NHCOC₆H₅ | —H | blue | 631 |

TABLE 1-continued
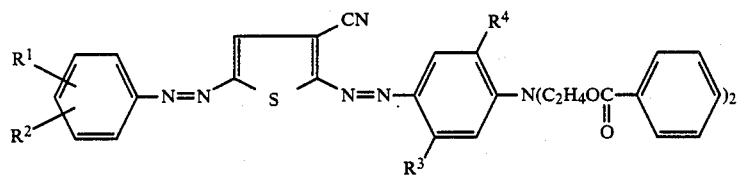
| No. | R¹/R² (aryl) | —R³ | —R⁴ | Hue of Dyed Fabric | λmax (acetone) (nm) |
|---|---|---|---|---|---|
| 27 | 4-F-C₆H₄— | —C₃H₇(n) | —H | blue | 620 |
| 28 | 4-OHC-C₆H₄— | —CH₃ | —H | blue | 629 |
| 29 | 3-F-C₆H₄— | —CH₃ | —CH₃ | blue | 628 |
| 30 | 3-F-C₆H₄— | —H | —OC₂H₅ | blue | 609 |
| 31 | 2-F-C₆H₄— | —NHCOCH₃ | —H | blue | 631 |
| 32 | 4-OHC-C₆H₄— | —NHCOC₆H₅ | —H | blue | 630 |
| 33 | 4-Cl-C₆H₄— | —H | —Cl | blue | 597 |

TABLE 2

Structure: R¹,R² substituted phenyl—N=N—[thiophene with CN and S]—N=N—phenyl(R⁴, R³)—N(C₂H₄OC(O)C₆H₅)₂

| No. | R¹/R² phenyl | —R³ | —R⁴ | Hue of Dyed Fabric | λmax (acetone) (nm) |
|---|---|---|---|---|---|
| 34 | phenyl | —C₂H₅ | —H | blue | 616 |
| 35 | " | —NHCOC₂H₅ | " | " | 631 |
| 36 | " | —NHSO₂CH₃ | " | " | 621 |
| 37 | " | —CH₃ | —CH₃ | " | 618 |
| 38 | " | —H | —OCH₃ | " | 622 |
| 39 | 2-NO₂-phenyl | " | " | greenish blue | 647 |
| 40 | 2,5-diCl-phenyl | —Cl | —OC₂H₅ | blue | 632 |
| 41 | 4-CN-phenyl | " | —OCH₃ | " | 628 |
| 42 | phenyl | —NHSO₂-phenyl | —H | " | 620 |
| 43 | 4-F-phenyl | —C₂H₅ | " | " | 619 |
| 44 | " | —NHCOC₂H₅ | " | " | 634 |
| 45 | " | —NHSO₂CH₃ | " | " | 624 |
| 46 | " | —CH₃ | —CH₃ | " | 621 |
| 47 | " | —H | —OCH₃ | " | 625 |
| 48 | 2-F-phenyl | —H | —OCH₃ | blue | 617 |
| 49 | 3-F-phenyl | —Cl | —OC₂H₅ | " | 620 |

TABLE 2-continued

Structure: R¹,R²-phenyl-N=N-[thiophene with CN]-N=N-phenyl(R³,R⁴)-N(C₂H₄OCOC₆H₅)₂

| No. | R¹/R²-phenyl | —R³ | —R⁴ | Hue of Dyed Fabric | λmax (acetone) (nm) |
|---|---|---|---|---|---|
| 50 | NCS-phenyl- | " | —OCH₃ | " | 628 |

TABLE 3

Structure: phenyl-N=N-[thiophene with CN]-N=N-phenyl-N(C₂H₄O-X-C₆H₄R⁵)₂

| No. | —X— | R⁵-phenyl | Color Tone of Dyed Fabric | λmax (acetone) (nm) |
|---|---|---|---|---|
| 51 | —CO— | —C₆H₄—Cl | blue | 605 |
| 52 | " | —C₆H₄—CH₃ | " | 605 |
| 53 | " | " | " | 605 |
| 54 | —COO— | —C₆H₄—Br | " | 603 |
| 55 | " | —C₆H₄—CH₃ | " | 603 |
| 56 | —CH₂— | " | " | 611 |
| 57 | " | —C₆H₄—Cl | " | 612 |
| 58 | —SO₂— | —C₆H₄—CH₃ | " | 603 |

TABLE 3-continued
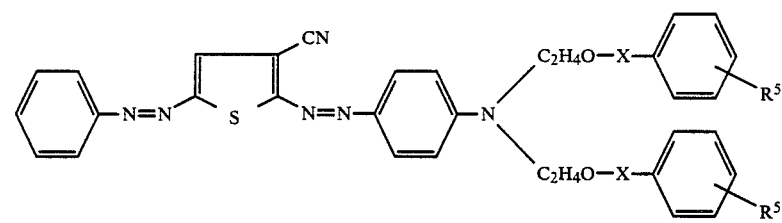
| No. | —X— | R⁵ | Color Tone of Dyed Fabric | λmax (acetone) (nm) |
|---|---|---|---|---|
| 59 | " | 4-Cl-phenyl | " | 603 |
TABLE 4
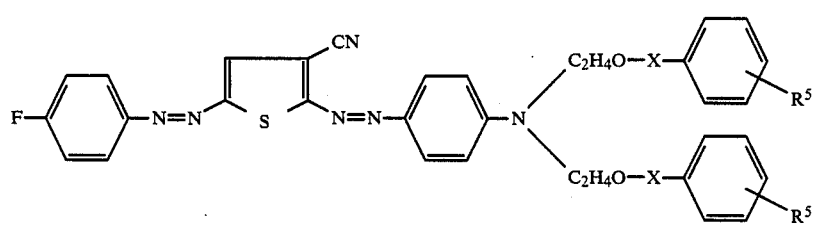
| No. | —X— | R⁵ | Color Tone of Dyed Fabric | λmax (acetone) (nm) |
|---|---|---|---|---|
| 60 | $-\overset{\|}{\underset{\|}{C}}-$ with =O | 4-Cl-phenyl | blue | 608 |
| 61 | " | 4-CH₃-phenyl | " | 608 |
| 62 | —CO—O— | 4-Br-phenyl | " | 606 |
| 63 | " | 4-CH₃-phenyl | " | 606 |
| 64 | —CH₂— | " | " | 614 |
| 65 | " | 4-Cl-phenyl | " | 615 |
| 66 | —SO₂— | 4-CH₃-phenyl | " | 606 |

TABLE 4-continued
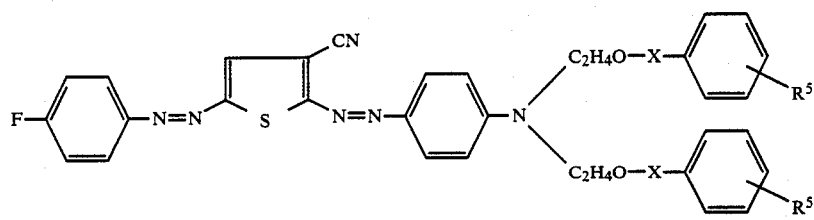
| No. | —X— |  R⁵ | Color Tone of Dyed Fabric | λmax (acetone) (nm) |
|---|---|---|---|---|
| 67 | " |  —Cl | " | 606 |
TABLE 5
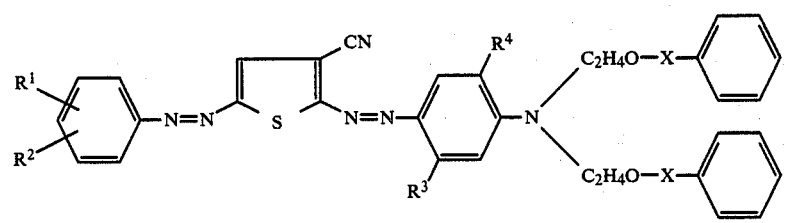
| No. | R¹ R² 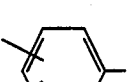 | —R³ | —R⁴ | 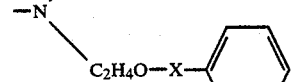 | Hue of Dyed Fabric | λmax (acetone) (nm) |
|---|---|---|---|---|---|---|
| 68 | 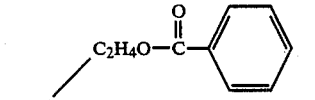 | —CH₃ | —H | 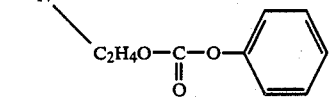 | blue | 617 |
| 69 | 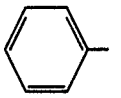 | —NHCOCH₃ | —H | 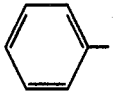 | greenish blue | 633 |
| 70 | F— | —CH₃ | —H | (same structure) | blue | 620 |

TABLE 5-continued
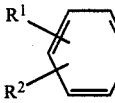
| No. | R¹ R² | −R³ | −R⁴ | −N(C₂H₄O−X−phenyl)₂ | Hue of Dyed Fabric | λmax (acetone) (nm) |
|---|---|---|---|---|---|---|
| 71 | 4-F-phenyl | −NHCOCH₃ | −H | −N(C₂H₄O−CO−phenyl)(C₂H₄O−CO−O−phenyl) | greenish blue | 636 |
| 72 | 4-OHC-phenyl | −NHCOH | −H | −N(C₂H₄O−CO−phenyl)(C₂H₄O−CO−O−phenyl) | greenish blue | 630 |
| 73 | phenyl | −NHCOCH₃ | −Cl | −N(C₂H₄OCH₂−phenyl)₂ | blue | 641 |

TABLE 6

[General structure with R¹, R² on first phenyl ring attached via N=N to thiophene (CN substituent), N=N to phenyl ring bearing R³, R⁴ and N(C₂H₄O-Ar-R⁵)₂]

| No. | R¹/R² phenyl | —R³ | —R⁴ | R⁵ phenyl | Hue of Dyed Fabric | λmax (acetone) (nm) |
|---|---|---|---|---|---|---|
| 74 | 4-Cl-phenyl | —H | —H | phenyl | blue | 620 |
| 75 | phenyl | —CH₃ | —H | phenyl | blue | 618 |
| 76 | 4-(N,N-diethylsulfamoyl)phenyl [(H₅C₂)₂N—SO₂—] | —H | —H | 4-CH₃-phenyl | blue | 625 |
| 77 | 3-CF₃-phenyl | —H | —H | phenyl | blue | 620 |
| 78 | 4-O₂N-phenyl | —H | —H | phenyl | greenish blue | 645 |

While the invention has been described in detail and with reference to specific embodiments thereof, it will be apparent to one skilled in the art that various changes and modifications can be made therein without departing from the spirit and scope thereof.

What is claimed is:

1. A disazo dye for dyeing cellulose-containing fibers represented by the following formula:

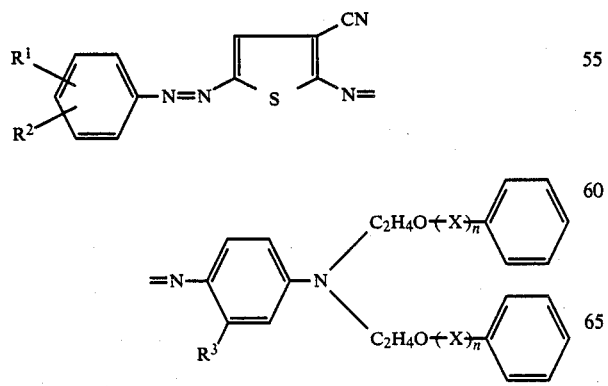

wherein R¹ represents hydrogen, R² represents halogen, nitro, cyano, thiocyanato, trifluoromethyl, formyl, lower alkoxycarbonyl or lower alkylsulfonyl, R³ represents hydrogen, methyl, chlorine or acylamino selected from the group consisting of acetylamino, propionylamino and methylsulfonylamino, —X— represents

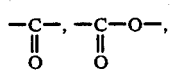

—SO₂— or —CH₂—, and n represents 0 or 1.

2. The disazo dye for dyeing cellulose-containing fibers as in claim 1, wherein —X— represents

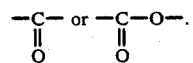

3. The disazo dye for dyeing cellulose-containing fibers as claimed in claim 1 represented by the following formula:

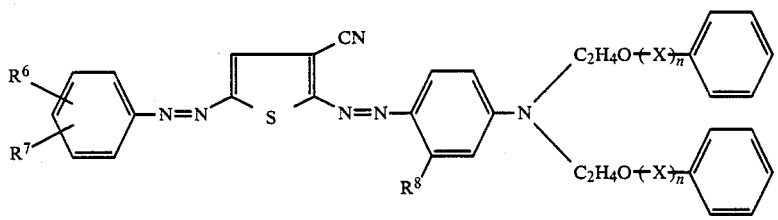

wherein $R^6$ represents hydrogen, $R^7$ represents halogen, cyano, nitro, trifluoromethyl or lower alkylsulfonyl, $R^8$ represents hydrogen, methyl or acetylamino, —X— represents

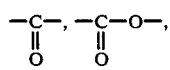

—SO$_2$— or —CH$_2$—, and n represents 0 or 1.

4. The disazo dye for dyeing cellulose-containing fibers as in claim 3, wherein X represents

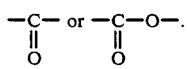

5. The disazo dye for dyeing cellulose-containing fibers as claimed in claim 4 represented by the following formula:

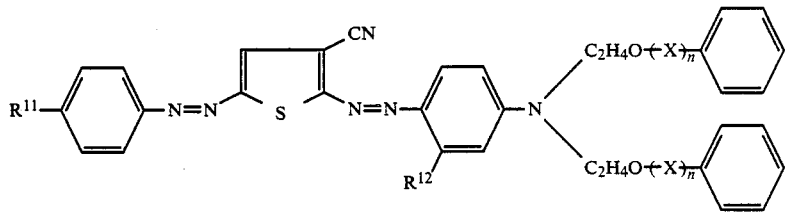

wherein $R^{11}$ represents fluorine, chlorine, cyano, methylsulfonyl or nitro, $R^{12}$ represents hydrogen or methyl, —X— represents

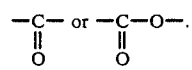

—SO$_2$— or —CH$_2$—, and n represents 0 to 1.

6. The disazo dye for dyeing cellulose-containing fibers as in claim 5, wherein X represents $-\underset{\underset{O}{\|}}{C}-$ or $-\underset{\underset{O}{\|}}{C}-O-$.

* * * * *